(12) United States Patent
Liu

(10) Patent No.: US 7,444,651 B2
(45) Date of Patent: Oct. 28, 2008

(54) CASING FOR OPTICAL DISK PLAYER

(75) Inventor: Jin-Feng Liu, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipe Hsien (TW)

( * ) Notice: Subject to any disclaimer, the term of this patent is extended or adjusted under 35 U.S.C. 154(b) by 496 days.

(21) Appl. No.: 11/021,922

(22) Filed: Dec. 23, 2004

(65) Prior Publication Data
US 2005/0229195 A1   Oct. 13, 2005

(30) Foreign Application Priority Data
Apr. 13, 2004   (CN)   ................. 2004 2 0044968

(51) Int. Cl.
*G11B 33/00*   (2006.01)
(52) U.S. Cl. ........................................... 720/655
(58) Field of Classification Search ........... 720/650, 720/624, 655; 360/99.06, 137; 369/72; 206/755; 296/76; D14/168
See application file for complete search history.

(56) References Cited

U.S. PATENT DOCUMENTS

| | | | | |
|---|---|---|---|---|
| 4,206,944 A * | 6/1980 | Kumagai et al. | ............... | 296/76 |
| 4,356,594 A | 11/1982 | Grosemans | | |
| 4,536,813 A * | 8/1985 | Saito | ............... | 360/137 |
| 4,562,566 A | 12/1985 | Eisemann | | |
| 5,341,357 A | 8/1994 | Mukawa et al. | | |
| 5,355,357 A | 10/1994 | Yamamori et al. | | |
| 5,467,235 A * | 11/1995 | Watanabe | ............... | 360/99.06 |
| 5,573,120 A * | 11/1996 | Kaufman et al. | ............ | 206/755 |
| D430,135 S * | 8/2000 | Isonaga | ............... | D14/168 |
| 6,128,265 A | 10/2000 | Leung | | |
| 6,657,940 B1 * | 12/2003 | Takeda et al. | ............... | 720/655 |
| 6,952,832 B2 * | 10/2005 | Lee et al. | ............... | 720/624 |
| 2002/0044513 A1 * | 4/2002 | Weng | ............... | 369/72 |

FOREIGN PATENT DOCUMENTS

CN   00253944   9/2001

* cited by examiner

*Primary Examiner*—Tianjie Chen
(74) *Attorney, Agent, or Firm*—Morris, Manning & Martin LLP; Tia Tingkang Xia

(57) ABSTRACT

A casing (10) for an optical disk player includes a body (14) for housing a disk playing mechanism, and a top lid (12). The top lid is closable downward to a closed position for covering at least part of the body, and is openable upward to an open position for loading or unloading an optical disk. A pair of pivot pins (440, 584) is formed on opposite lateral sides of the body respectively, and a pair of pivot holes (220, 34) is defined in opposite lateral sides of the top lid respectively. The pivot pins are movably received in the pivot holes. A resilient member (56) is interposed between the body and the top lid, for resiliently loading the top lid in a direction toward its open position. In assembly, at least one of the pivot pins is insertable into the corresponding pivot hole by deforming the top lid slightly.

19 Claims, 3 Drawing Sheets

CASING FOR OPTICAL DISK PLAYER

BACKGROUND OF THE INVENTION

1. Field of the Invention

The present invention generally relates to disk players for reproducing information signals recorded on an information disk such as an optical disk, and particularly relates to a casing for an optical disk player which comprises a housing and a lid rotatably connected to the housing.

2. Description of Prior Art

A conventional portable disk player generally has a main body mounted on a chassis, and a lid pivotally connected to the chassis. Pivoting spindles are arranged on a rear of the chassis or the lid, with the spindles movably engaged in the lid or the chassis as the case may be. The lid can be opened and closed, for unloading and loading of an optical disk from and onto the main body.

China Patent No. 00253944.6 discloses an outer casing for an optical disk player, which includes a housing and a lid rotatably hinged with the housing. A pair of engaging portions is formed on a rear of the lid. A pair of connecting portions is formed on the housing, with the connecting portions respectively abutting the engaging portions. A pair of pivots is movably received in the connecting portions respectively. Each pivot has one end elastically contact the corresponding connecting portion, and an opposite end extending through the connecting portion and engaging with a corresponding engaging portion. A recess is located between the two connecting portions, and a rail is retained in the recess. A torque spring is located in the recess, with opposite helical portions of the spring engaged around the rail. Opposite ends of the spring abut against the recess, and a central portion of the spring between helical portions biases against the lid. Thus the spring can lift the lid from a closed position to a raised, open position.

However, the above-described hinging structure is rather complex, and it is inconvenient for an operator to manually assemble the outer casing during manufacture of the optical disk player. This reduces the speed, precision and efficiency of production.

SUMMARY OF THE INVENTION

Accordingly, an object of the present invention is to provide a casing for an optical disk player which has a simple structure and which is conveniently assembled.

To achieve the above object, a casing for an optical disk player in accordance with the present invention includes a body for housing a disk playing mechanism, and a top lid. The top lid is closable downward to a closed position for covering at least part of the body, and is openable upward to an open position for loading or unloading an optical disk. A pair of pivot pins is formed on opposite lateral sides of the body respectively, and a pair of pivot holes is defined in opposite lateral sides of the top lid respectively. The pivot pins are movably received in the pivot holes. A resilient member is interposed between the body and the top lid, for resiliently loading the top lid in a direction toward its open position. In assembly, at least one of the pivot pins is insertable into the corresponding pivot hole by deforming the top lid slightly.

BRIEF DESCRIPTION OF THE DRAWINGS

Other objects, advantages and novel features of the present invention will be drawn from the following detailed description with the attached drawings, in which.

DETAILED DESCRIPTION OF PREFERRED EMBODIMENT

Figure 1:
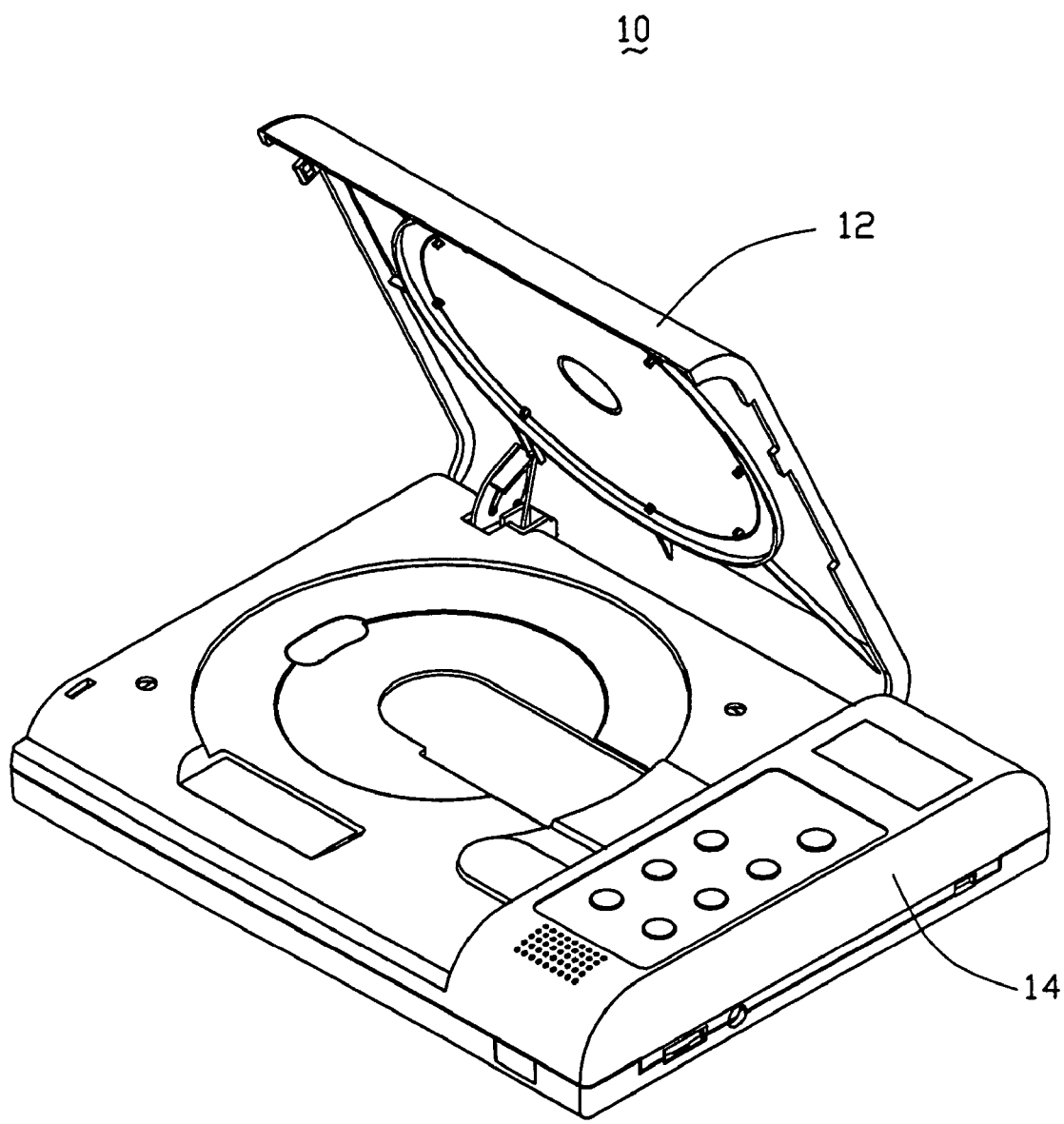
FIG. 1 is an isometric view of a casing for an optical disk player in accordance with the present invention.

Referring to FIG. 1, a casing 10 for an optical disk player in accordance with the present invention has a generally flat rectangular player body 14, and a generally rectangular top lid 12 rotatably hinged to the player body 14. The player body 14 houses a disk playing mechanism (not shown). The disk playing mechanism includes a spindle motor (not shown) for supporting and rotating an optical disk (not shown), and an optical pickup unit (not shown) moving along a radial path of the optical disk for reading information from the optical disk.

Figure 2:
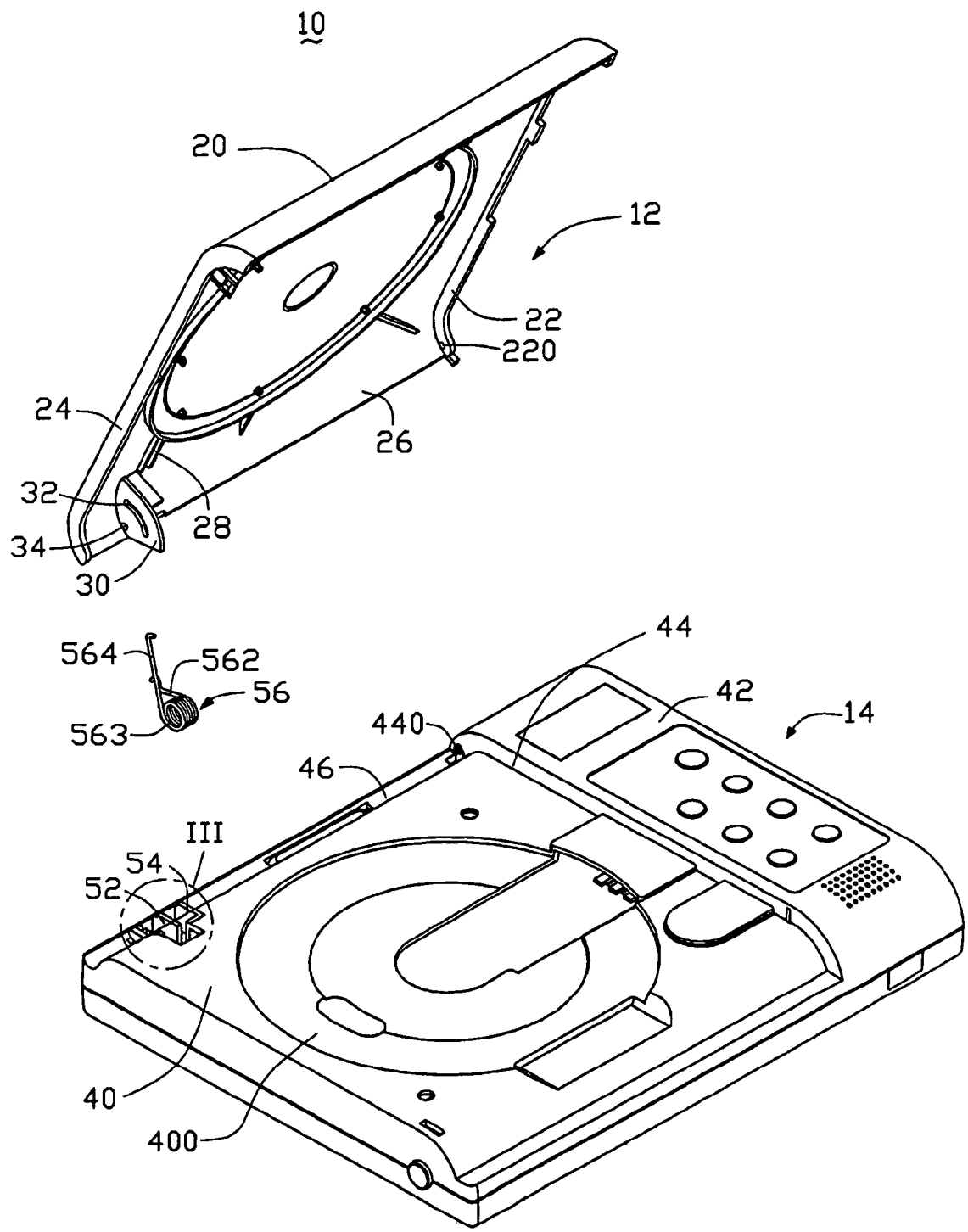
FIG. 2 is an exploded, isometric view of the casing for an optical disk player in accordance with the present invention.
Figure 3:
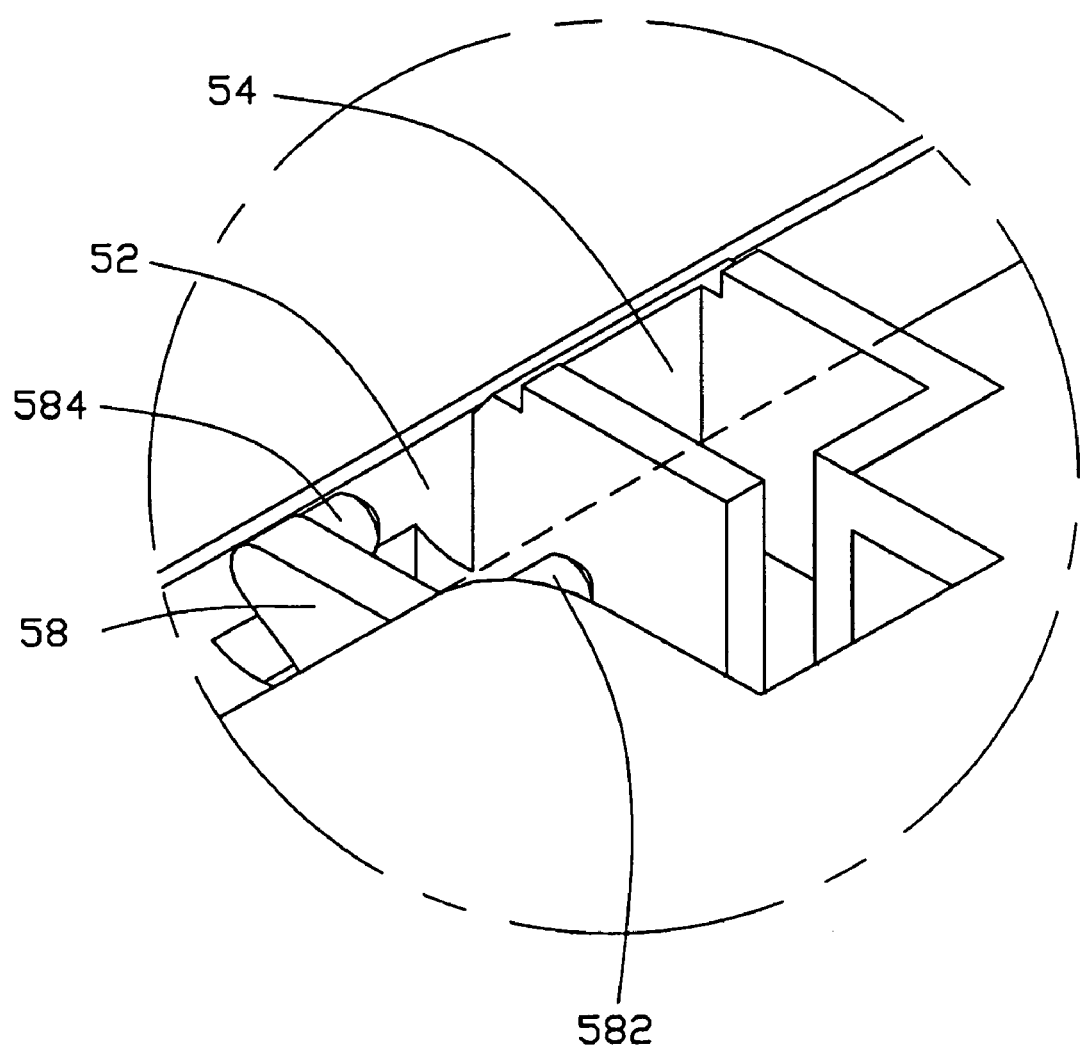
FIG. 3 is an enlarged view of a circled portion III of FIG. 2.

Referring to FIGS. 2 and 3, the player body 14 defines a main plane 40 on an upper surface thereof. The player body 14 includes a long, recessed engaging portion 46 smoothly adjoining a rear side (not labeled) of the main plane 40, and a rectangular raised portion adjacent both a lateral side of the main plane 40 and a right end of the engaging portion 46. A cross-section of the engaging portion 46 is approximately semicircular. The raised portion functions as a control panel 42. An array of operating keys (not labeled) is mounted on the control panel 42, by which users control reading out of information signals recorded on the optical disk. A round recess 400 is formed in a center of the main plane 40, for accommodating the optical disk. The top lid 12 is pivotably connected to the engaging portion 46 by hinging means provided at the engaging portion 46 and on the top lid 12. The top lid 12 can be rotated down to a closed position, in which it covers the entire main plane 40 and is coplanar with the control panel 42. The top lid 12 can be rotated up to an open position (as in FIG. 1), in which the round recess 400 is accessible so that the optical disk can be loaded or unloaded.

The player body 14 also includes a connecting wall 44, which interconnects the main plane 40 and the engaging portion 46 with the control panel 42. A first pivot pin 440 horizontally extends from the connecting wall 44 above the right end of the engaging portion 46. A cavity 52 is commonly defined in a left side of the engaging portion 46 and an adjoining portion of the player body 14 at the main plane 40. A block 58 is provided in and above the cavity 52, the block 58 spanning generally between the main plane 40 and a rear edge of the engaging portion 46. A second pivot pin 584 extends from the block 58 toward the first pivot pin 440. That is, the first and second pivot pins 440 and 584 are aligned along a pivot axis (not shown), for rotatable connection of the top lid 12 to the player body 14. A slide pin 582 extends from said adjoining portion of the player body 14 into the cavity 52. The slide pin 582 extends in a same direction as the second pivot pin 584, is parallel to the second pivot pin 584, and is spaced a predetermined distance from the second pivot pin 584. A holding recess 54 as another cavity of the body is commonly formed in the left side of the engaging portion 46 and said adjoining portion of the player body 14 at the main plane 40, the holding recess 54 being located to the right of and adjacent the cavity 52.

The top lid 12 has a main panel 20, and a pair of flanges 22 and 24 extending down from two opposite lateral sides of the main panel 20 respectively. The top lid 12 thus has a very shallow U-shaped cross-section. The main panel 20 has a curved rear portion 26 for abutting the rear edge of the engaging portion 46 of the player body 14. A plate-like supporting member 30 perpendicularly extends from a common interior surface of a rear corner of the main panel 20 and the curved rear portion 26, corresponding to the cavity 52. The supporting plate 30 defines a guide slot 32 and a second pivot hole 34. The second pivot hole 34 is located at the center of an imaginary circle of which the guide slot 32 forms a part. A radius of said circle is equal to the distance between the slide pin 582 and the second pivot pin 584 of the player body 14. The flange 22 defines a first pivot hole 220 in a rear end thereof. The first and second pivot holes 220 and 34 are aligned along a pivot axis (not shown), for rotatable connection of the top lid 12 to the player body 14. A pair of parallel ribs 28 is formed on the interior surface of the main panel 20. The ribs 28 are parallel to the flange 24, and extend forward from the supporting plate 30.

A resilient member 56 is interposed between the player body 14 and the top lid 12, for resiliently loading the top lid 12 in a direction toward the open position. The resilient member 56 compensates for the force of gravity which acts on the top lid 12.

The resilient member 56 is a wire torque spring which has a helical part 563, a first extending part 564 located on a left side of the helical part 563, and a second fixing part 562 located on a right side of the helical part 563. The helical part 563 is lodged in the holding recess 54 of the player body 14, with the first extending part 564 protruding up from the holding recess 54. The second fixing part 562 engages with a fixing means (not shown) defined in a bottom of the holding recess 54, so as to fix the resilient member 56 in the holding recess 54. The first extending part 564 has a bent free end (not labeled), which serves to transmit spring force to the top lid 12.

When assembling the top lid 12 onto the player body 14, the curved rear portion 26 of the main panel 20 of the top lid 12 is set above the engaging portion 46 of the player body 14. The supporting plate 30 is inserted into the cavity 52 and abuts the block 58. The first pivot pin 584 of the player body 14 is received through the second pivot hole 34 of the top lid 12, and simultaneously the slide pin 582 of the player body 14 is received through the guide slot 32 of the top lid 12. The free end of the first extending part 564 of the resilient member 56 is located between the ribs 28, and presses against the interior surface of the main panel 20 thereat. Finally, the flange 22 of the top lid 12 is deformed leftward slightly, so as to enable the second pivot pin 440 to be received and retained in the first pivot hole 220. The top lid 12 is thus readily to hinged to the player body 14. In order to make the attachment process more convenient, a free end of the first pivot pin 440 can be beveled.

When an optical disk is placed onto the round recess 400 of the player body 14, the top lid 12 is then manually pressed down and locked in the closed position by a locking mechanism (not labeled) provided on front corners of the top lid 12 and the player body 14. In this process, the resilient member 56 deforms and acquires elastic potential energy. When the locking mechanism is manually unlocked, the top lid 12 is released from the player body 14, the resilient member 56 rebounds, and the top lid 12 automatically rotates up to the open position under force of the resilient member 56.

Although the present invention has been described with reference to a specific embodiment, it should be noted that the described embodiment is not necessarily exclusive, and that various changes and modifications may be made to the described embodiment without departing from the scope of the invention as defined by the appended claims.

What is claimed is:

1. A casing for an optical disk player, comprising:
a body for housing a disk playing mechanism, and the body defining a cavity therein at one side thereof;
a top lid which is closable downward to a closed position for covering at least part of the body, and which is openable upward to an open position for loading or unloading an optical disk, and the top lid comprising a main panel and a pair of flanges extending from opposite sides of the main panel, and the main panel of the top lid having an interior surface and a supporting plate extending from the interior surface for being received in the cavity when the top lid is in the closed position;
a pair of pivot pins provided on opposite sides of the body, and a pair of pivot holes defined in corresponding opposite sides of the top lid, and one of the pivot pins extending into the cavity; and
a resilient member interposed between the body and the top lid, for resiliently loading the top lid in a direction toward its open position;
wherein, the pivot pins are movably received in the pivot holes, and one of the flanges defining one of the pivot holes.

2. The casing in accordance with claim 1, wherein at least one of the pivot pins is insertable into the corresponding pivot hole by deforming the top lid.

3. The casing in accordance with claim 1, wherein the supporting plate defines the other pivot hole.

4. The casing in accordance with claim 1, wherein the supporting plate further defines a guide slot.

5. The casing in accordance with claim 4, wherein the guide slot is arcuate, and the pivot hole of the supporting plate is located at the center of an imaginary circle of which the guide slot forms a part.

6. The casing in accordance with claim 4, wherein the body further includes a guide pin movably received in the guide slot of the top lid.

7. The casing in accordance with claim 1, wherein the resilient member includes a helical part, and an extending part located on a side of the helical part.

8. The casing in accordance with claim 7, wherein the helical part is lodged in a holding recess formed in the body, and the extending part protrudes from the holding recess.

9. The casing in accordance with claim 8, wherein the extending part has a hook-shaped free end resiliently contacting the top lid.

10. The casing in accordance with claim 9, wherein the top lid includes a pair of parallel ribs formed on the interior surface, and the hook-shaped free end of the extending part is restricted between the parallel ribs.

11. The casing in accordance with claim 1, wherein one of the pivot pins has a slant at a free end thereof.

12. The casing in accordance with claim 1, wherein the body includes a main plane, an engaging portion curved downward from a rear side of the main plane, and a raised portion adjacent both the main plane and the engaging portion.

13. The casing in accordance with claim 12, wherein the body further includes an array of operating keys mounted on the raised portion, the operating keys being adapted for controlling reading out of information signals recorded on the optical disk.

14. The casing in accordance with claim 12, wherein the body further includes a connecting wall interconnecting the engaging portion and the raised portion, and one of the pivot pins perpendicularly extends from the connecting wall.

15. A casing for an optical disk player, comprising:

a body for housing a disk playing mechanism of said optical disk player therein, said body having at least two neighboring cavities formed beside said disk playing mechanism;

a lid movable with respect to said body between a closed position of enclosing said disk playing mechanism together with said body, and an open position of revealing said disk playing mechanism to an outside of said optical disk player, said lid having a supporting member formed corresponding to one of said at least two juxtaposing cavities and extendable into said one of said at least two juxtaposing cavities to movably connect said lid with said body; and a resilient member installed in another of said at least two neighboring cavities to resiliently control movement of said lid relative to said body.

16. The casing in accordance with claim 15, wherein at least two pivot pins extend into said one of said at least two neighboring cavities so as to pivotally engage with said supporting member in order for performing said movement of said lid between said closed position and said open position.

17. The casing in accordance with claim 16, wherein at least two pivot holes are defined in corresponding opposite sides of the lid to movably receive the at least two pivot pins, and one of the at least two pivot holes is defined in the supporting member.

18. The casing in accordance with claim 17, wherein a guide slot is defined in the supporting member to movably receive a sliding pin extending from the body.

19. A casing for an optical disk player, comprising:

a body for housing a disk playing mechanism;

a top lid which is closable downward to a closed position for covering at least part of the body, and which is openable upward to an open position for loading or unloading an optical disk;

a pair of pivot pins provided on opposite sides of the body, and a pair of pivot holes defined in corresponding opposite sides of the top lid; and a resilient member interposed between the body and the top lid, for resiliently loading the top lid in a direction toward its open position;

wherein, the pivot pins are movably received in the pivot holes, and a supporting plate extends from an interior surface of the top lid, and the supporting plate defines a guide slot, and the body comprises a sliding pin for being movably received through the guide slot.

* * * * *